Sept. 27, 1927.
C. RORABECK
1,643,472
RENEWABLE RIM SPROCKET WHEEL
Filed May 9, 1924    2 Sheets-Sheet 2
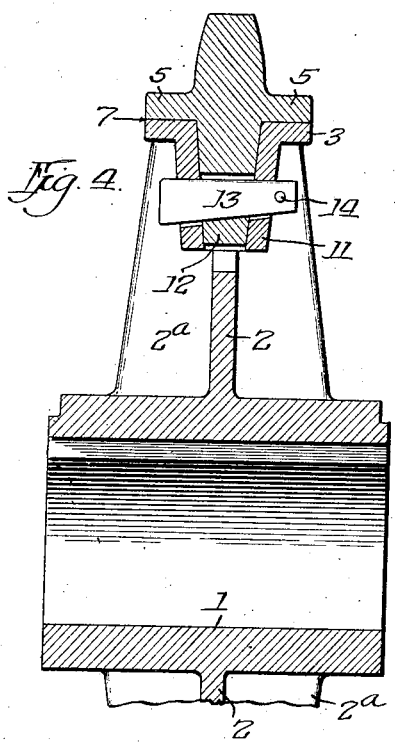
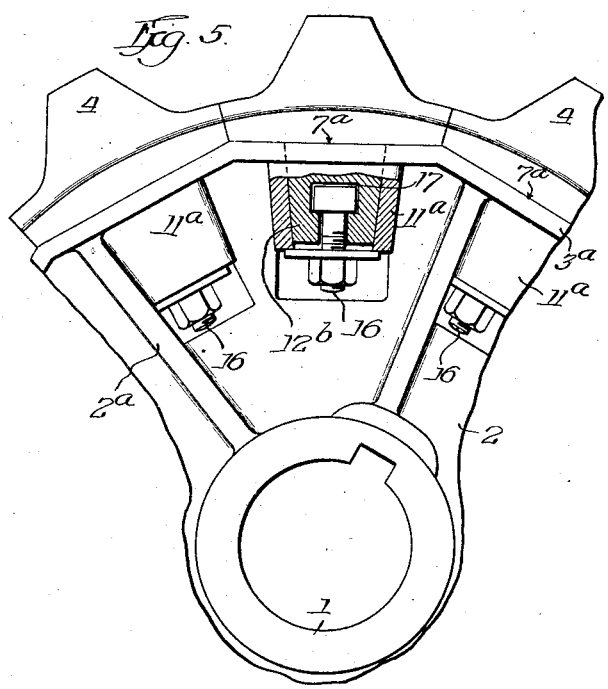
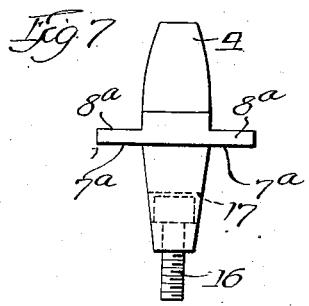
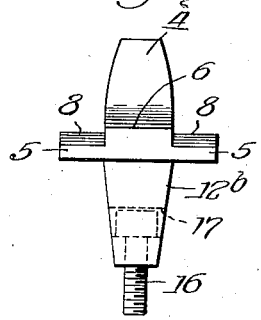
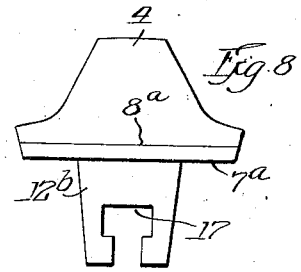
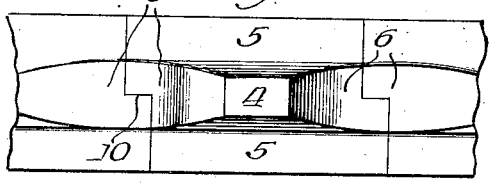
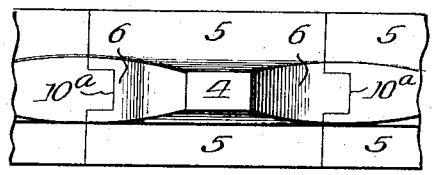
Witness:
Inventor,
Claude Rorabeck,
By Wilkinson, Huxley, Byron & Knight
Attys.

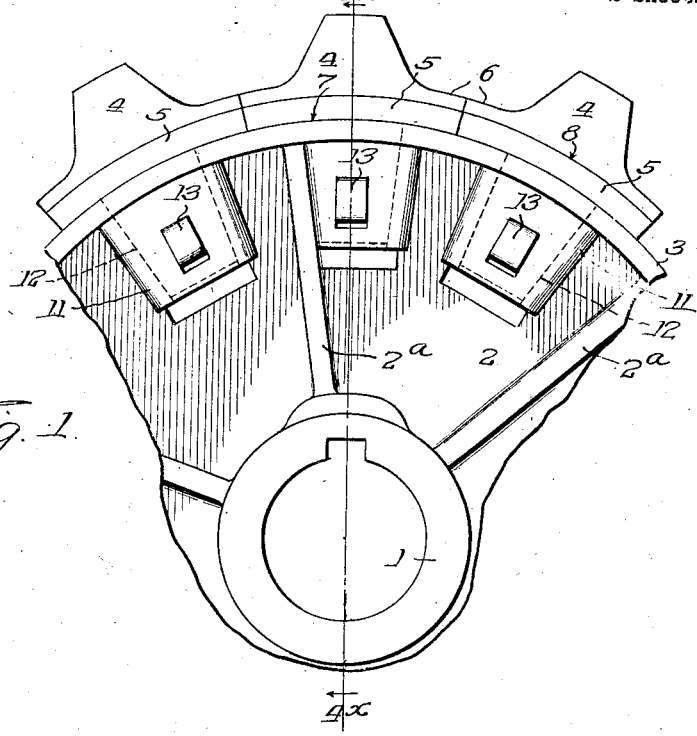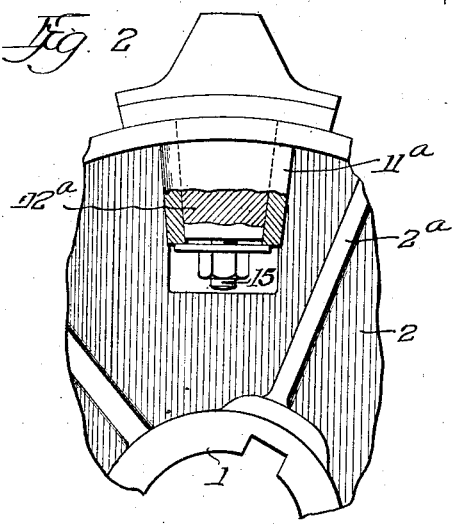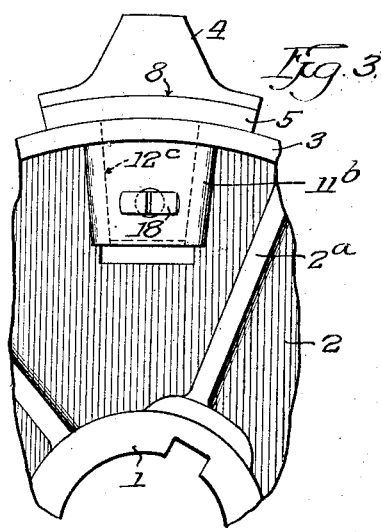

Patented Sept. 27, 1927.

1,643,472

UNITED STATES PATENT OFFICE.

CLAUDE RORABECK, OF CHICAGO HEIGHTS, ILLINOIS, ASSIGNOR TO AMERICAN MANGANESE STEEL COMPANY, OF CHICAGO, ILLINOIS, A CORPORATION OF MAINE.

RENEWABLE-RIM SPROCKET WHEEL.

Application filed May 9, 1924. Serial No. 711,961.

This invention relates to sprocket wheels of the kind in which teeth are removably applied to the rim of the wheel in a manner to render them replaceable when worn.

One object of the invention is to prolong the life of not only the teeth but those portions of the rim of a sprocket wheel which are subjected to wear, and, to this end, one feature of the invention consists in providing a replaceable tooth sprocket wheel in which not only the teeth but also the sections of the rim adjacent to the teeth, and particularly those portions of the rim which receive the links in bearing, are replaceable with the teeth.

Another object of the invention is to increase the life of even the replaceable sections, and, to this end, another feature consists in providing a sprocket wheel with replaceable teeth and rim sections so designed that they may be reversed in position upon the wheel and thus present different portions of the replaceable units successively to positions of greater wear, and thereby correspondingly prolong the use of the replaceable parts.

Another object of the invention is to provide a construction of replaceable tooth which will afford a broad base through which the tooth is seated upon the wheel and by which the tooth may be made much more secure against displacement, to which end, inter-tooth and lateral rim portions are made integral with the teeth and constitute a tooth base which is fitted to the body of the wheel.

Still another object of the invention is to provide improved means for drawing to a firm seating upon the wheel, a replaceable tooth section and particularly a broad base tooth and rim section of the kind described, to which end, a further feature of the invention consists in mounting the replaceable sections upon the wheel through the medium of shanks entering radial sockets of the wheel, and drawing these shanks firmly into their sockets by wedges, tap screws, or other means, but preferably through means of wedges passing transversely through the walls of the sockets and their contained shanks.

In carrying out the invention, the entire wearing portion of the wheel, including the teeth, is formed in replaceable sections, the tread sections being developed with shelves or flange-like extensions at the sides of the teeth, and preferably held in position by the same means that holds the teeth in position upon the wheel, for instance, by making the shelves or lateral rim sections integral with the teeth or constituting the bases from which the teeth project. In the preferred embodiment of the invention, the rim portions between the circumferential planes which define the sides of the teeth, and which lie, respectively, in front and in rear of the teeth, regarding the direction of travel, and which are likewise made replaceable, are also integral with or constitute a part of the bases of the teeth, but are at a higher level or radially more remote from the center of the wheel than the side shelves, so that they will be adapted to receive and support the solid or driving links of a chain which engage the teeth in receiving or imparting the drive of the wheel while the side shelves are supporting the deeper side links that extend across the teeth in connecting these driving links. Thus, in the preferred embodiment, each replaceable rim member of the sprocket wheel comprises, as an integral structure, a tooth portion, lateral shelves affording chain bearings, a laterally enlarged sustaining base for the tooth portion, and inter-tooth shelf portions of greater thickness than the lateral shelf portions, providing a circumferentially extended base which assists in sustaining the tooth against tipping in the direction of its load, in addition to affording bearing for the driving links; and each tooth section so constituted is held in place upon the wheel and has its base drawn into firm seating upon the wheel by means of a shank entering a radial socket in the wheel and drawn thereinto by a wedge, screw, or equivalent means.

In the accompanying drawings—

Figure 1 is a side view of a portion of a sprocket wheel embodying the several features of the present invention, and in which wedges are illustrated as the specific means for drawing the sections to their seats.

Figures 2 and 3 are side views showing portions of a wheel with replaceable rim sections secured by alternative means.

Figure 4 is a section on the line 4×—4× of Figure 1.

Figure 5 is a view similar to Figure 1 showing a polygonal form of wheel body and correspondingly designed rim sections therefor; also a further modification of the means for drawing a rim section to its seat.

Figure 6 is a detail view of the rim section shown in Figure 5, but in a plane at right angles thereto.

Figures 7 and 8 are two detail views at right angles to each other, of still another form of tooth applicable to the polygonal form of wheel body.

Figure 9 is a plan view of a portion of a sprocket wheel rim provided with removable sections and showing one form of circumferential abutment between rim sections; and Figure 10 is a view similar to Figure 9 showing another form of circumferential abutment between rim sections.

Referring to Figures 1 to 4, 1 represents the hub, 2 the web having strengthening ribs 2ª, and 3 the integral rim of a sprocket wheel. In accordance with the present invention, it is proposed to provide such a wheel with sprocket teeth 4 that may be replaced when worn, and also to compensate for wear upon those portions of the wheel rim which are adjacent to the teeth; and, to this end, the present invention provides the teeth 4 with lateral shelves 5 which overlie the integral rim 3, or such portion thereof as may be necessary to prevent wear upon said integral rim, and these side shelves are preferably formed integrally with the teeth 4 so that they constitute enlarged bases for the teeth and may be secured in place by the same means which holds the teeth to the wheel. The replaceable rim sections include tread portions or shelves 6 between the teeth in addition to the lateral shelves 5, and these are preferably in a circumferential plane more remote from the center of the wheel than are the shelves 5; in other words, they are of greater thickness than the shelves 5, and this difference in dimension preferably corresponds to the difference which exists in the dimensions of the solid or driving links of the standard construction of chain employed on such a wheel, and the side links of said chain which connect the solid links.

The replaceable rim sections comprising the teeth and the tread portions which provide the bases for the teeth may be designed as shown in Figures 1, 2, and 3, with cylindrical surfaces 7 through which they meet the integral rim 3 of the wheel, or, as shown in Figure 5, the wheel may have a polygonal integral rim 3ª receiving the renewable sections through the medium of faces 7ª that constitute sides of a regular polygon. Again, the side shelves 5 which provide treads for side links of the chain may constitute sections 8 of a cylindrical surface, as shown in Figures 1, 2, 3, and 5, or, they may be constructed with external faces 8ª of a regular polygon, parallel with the faces 7ª as shown in Figures 7 and 8.

The renewable wheel sections will preferably be in circumferential abutment against one another through faces lying in planes radial to the wheel so that they wedge together in assembly, and their abutting faces may be stepped or offset in the direction of the circumference of the wheel as shown at 10 in Figure 9, thereby establishing a firmer transverse interlock between the sections, or the offsetting may be elaborated so that they will be rabbeted together, as shown at 10ª in Figure 10.

In order to mount upon the wheel replaceable rim sections constructed in accordance with one or another of the several forms herein described, or other forms that might be designed within the scope of the present invention, the wheel is constructed with sockets to receive the sections, such, for instance, as the socket 11 to receive the shank 12 (Figures 1 and 4), or a socket 11ª to receive shank 12ª (Figure 2), or such a socket 11ª to receive shank 12ᵇ (Figures 5 and 6), or a socket 11ᵇ to receive shank 12ᶜ (Figure 3), and these shanks are all tapered to make a wedging fit and are secured in their sockets in any one of various ways, such, for instance, as by a transverse wedge 13 passing through the socket and shank (Figures 1 and 4) and there locked through means of a cotter pin 14, or by means of a tap screw 15 as shown in Figure 2, or by means of a bolt 16 having its head fitted in T-slot 17 (Figures 5 to 8), or, if preferred, by merely passing a cotter pin 18 (Figure 3) directly through the socket 11ᵇ and shank 12ᶜ, the three methods first named involving the advantage of drawing the shanks as well as the radial faces of the rim sections to their tapered seating, and the last named method holding the position of the rim sections after being driven to their tapered seating by means of a maul.

An important feature of the present invention when embodied in a preferred design, is that the inter-tooth shelf sections 6, the lateral shelf sections 5, the faces through which the removable sections meet the wheel and abut against each other, and the meeting faces of the shanks and sockets are all so symmetrically formed that a tooth section is applicable to a wheel in either of two positions, so that when badly worn by use in one position upon the wheel, it may be released, rotated 180°, and restored to interlock with the wheel in a new position which will present less worn surfaces to the positions of greatest wear, and thus greatly prolong the life of the sections.

A wheel equipped with replaceable tooth and tread sections in accordance with the present invention is peculiarly well adapted for construction of its body portion and its replaceable portions out of different grades of metal, for instance, a substantial grade of carbon steel for the body portion, and commercial manganese steel of formula best adapted to resist erosion for its replaceable sections.

I claim:

1. A sprocket wheel having replaceable rim members, each comprising a tooth portion and shelf portions; said rim members being constructed to enter into circumferential abutment one against another when in position upon the wheel, and having faces through which they abut, constructed with circumferentially extending offsets that interlock the members against relative lateral displacement.

2. A sprocket wheel having replaceable rim members, each comprising a tooth portion and shelf portions; said rim members being constructed to enter into circumferential abutment one against another through substantially radial wedging faces when in position upon the wheel, and having faces through which they abut, constructed with circumferentially extending offsets that interlock the members against relative lateral displacement.

Signed at Chicago Heights, Illinois, this 5th day of May, 1924.

CLAUDE RORABECK.